(12) United States Patent
Buthker (10) Patent No.: US 12,062,982 B2
(45) Date of Patent: Aug. 13, 2024

(54) CONSTANT ON-TIME BOOST CONVERTER (71) Applicant: NXP B.V., Eindhoven (NL)

(72) Inventor: Henricus Cornelis Johannes Buthker, Mierlo (NL)

(73) Assignee: NXP B.V., Eindhoven (NL)

( * ) Notice: Subject to any disclaimer, the term of this patent is extended or adjusted under 35 U.S.C. 154(b) by 239 days.

(21) Appl. No.: 17/692,297

(22) Filed: Mar. 11, 2022

(65) Prior Publication Data
US 2023/0291312 A1 Sep. 14, 2023

(51) Int. Cl.
H02M 3/158 (2006.01)
H02M 1/08 (2006.01)
H02M 3/157 (2006.01)

(52) U.S. Cl.
CPC ............ *H02M 3/158* (2013.01); *H02M 1/08* (2013.01); *H02M 3/157* (2013.01)

(58) Field of Classification Search
CPC ......... H02M 3/158; H02M 3/157; H02M 1/08
See application file for complete search history.

(56) References Cited

U.S. PATENT DOCUMENTS

| 7,135,841 | B1 * | 11/2006 | Tomiyoshi | H02M 3/156 323/224 |
|---|---|---|---|---|
| 8,779,731 | B2 | 7/2014 | Menegoli et al. | |
| 8,786,269 | B2 | 7/2014 | Menegoli et al. | |
| 8,970,191 | B1 | 3/2015 | Wong et al. | |
| 9,065,337 | B2 | 6/2015 | Tanabe et al. | |
| 9,985,528 | B2 | 5/2018 | Romeo | |
| 10,284,086 | B2 * | 5/2019 | Li | H02M 3/1588 |
| 11,509,210 | B1 * | 11/2022 | Sun | H02M 1/0043 |
| 2015/0280544 | A1 * | 10/2015 | Wang | H02M 1/32 323/285 |
| 2021/0242774 | A1 | 8/2021 | Yun et al. | |

FOREIGN PATENT DOCUMENTS

EP 3503393 B1 * 2/2022 ............. G05F 1/625

OTHER PUBLICATIONS

Cheng et al., "A Constant Off-time Controlled Boost Converter with Adaptive Current Sensing Technique," IEEE 978-1-4577-0704-9/10, 2011, pp. 443-446; 4 pages.
Wang et al., Multi-switching Period Oscillation Phenomenon in Constant-on-time Controlled Buck-Boost Converter, IEEE 978-1-5090-1210-7/16/, 2016; 4 pages.
Wang et al., "A High Efficiency [sic] DC/DC Boost Regulator with Adaptive Off/On-Time Control," IEEE 978-1-4673-4436-4/13, 2013; 4 pages.
Xu et al., "A Quasi Fixed Frequency Constant On Time Controlled Boost Converter," IEEE 978-1-4244-1684-4/08, 2008, pp. 2206-2209; 4 pages.

* cited by examiner

Primary Examiner — Harry R Behm (57) ABSTRACT

A boost converter comprises a comparator circuit including: a first input port configured to receive an off-time sawtooth voltage a second input port configured to receive an on-time sawtooth voltage, the comparator circuit comparing the off-time sawtooth voltage and on-time sawtooth voltage to generate trigger signal including a differential ripple voltage that is output by an output port to a power stage circuit. The boost converter further comprises a reference voltage source that provides a reference voltage to the first input port and a feedback circuit that provides the on-time sawtooth voltage to the second port, wherein the differential ripple voltage emulates an inductor current or voltage of an output capacitor of the power stage circuit.

19 Claims, 6 Drawing Sheets

CONSTANT ON-TIME BOOST CONVERTER

FIELD

The present disclosure relates generally to integrated circuits, and more specifically, to a boost converter for mobile electronic devices.

BACKGROUND

Boost converters are widely used in battery-powered portable electronic devices for a step up of the supply voltage of a battery to a stabilized higher output voltage, which in turn can allow for a reduced antenna and coil size which can reduce the footprint of a mobile electronic device so that it may be small and lightweight. In order to extend the battery life and assure the display quality, high efficiency and fast dynamic response are required.

Modern boost converters preferably operate where single current pulses occur. The time between pulses varies with the load, but should be uniformly distributed. In a burst mode, multiple pulses rapidly follow each other, with no idling time in between. The burst mode is caused by delays in the feedback loop and results in a high ripple on the output voltage and higher switching losses.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A conventional boost converter voltage loop circuit typically includes a comparator, a reference, and a feedback divider. A conventional approach to reducing instability is to add an equivalent series resistance (ESR) to an output capacitor in parallel with the feedback divider coupled to the feedback node of the comparator, which has a relevant influence on system stability. However, an insufficient ESR value may result in a high output ripple, while a larger value of the output capacitor consumes a significant circuit area. In addition, an on-chip sense-FET current sensor at the power stage of the converter may be required to reduce the power consumption that further increases the circuit footprint.

Another conventional approach is to provide an RC network across the inductor for stabilizing the inductor current. However, an RC network is larger on silicon because of the capacitors and can require additional integration complexities to the need for the RC network to insert a zero in the feedback loop for providing an additional phase margin.

In brief overview, embodiments of the present inventive concept include a boost converter that does not require an RC network or current sensor for stability, but instead relies on sawtooth-shape voltage signals generated by on time and off time control circuits, respectively, and provided to a voltage loop circuit that allows system stability to be achieved. In particular, the sawtooth-shape voltage signals are received at the two voltage inputs of a comparator circuit or the like, or more specifically, an off-time sawtooth wave of the voltage signals may act on a reference node or non-inverting input and an on-time sawtooth wave of the voltage signals may act on the feedback node or inverting input of a comparator circuit. The "on-time" and "off-time" are well-known periods of the boost converter's duty cycle, where the "on-time" pertains to the amount of time that the loop circuit is turned on in the cycle, and the "off-time" pertains to the amount of time that the loop circuit is turned off.

The difference of the two voltage signals acts similar to a synthetic ripple. This synthetic ripple will emulate a zero in the feedback loop, similar to the RC network, but without the need for the added complexity provided by external or high-voltage components. The zero in the feedback loop provides sufficient phase margin to prevent the burst mode.

Figure 1:
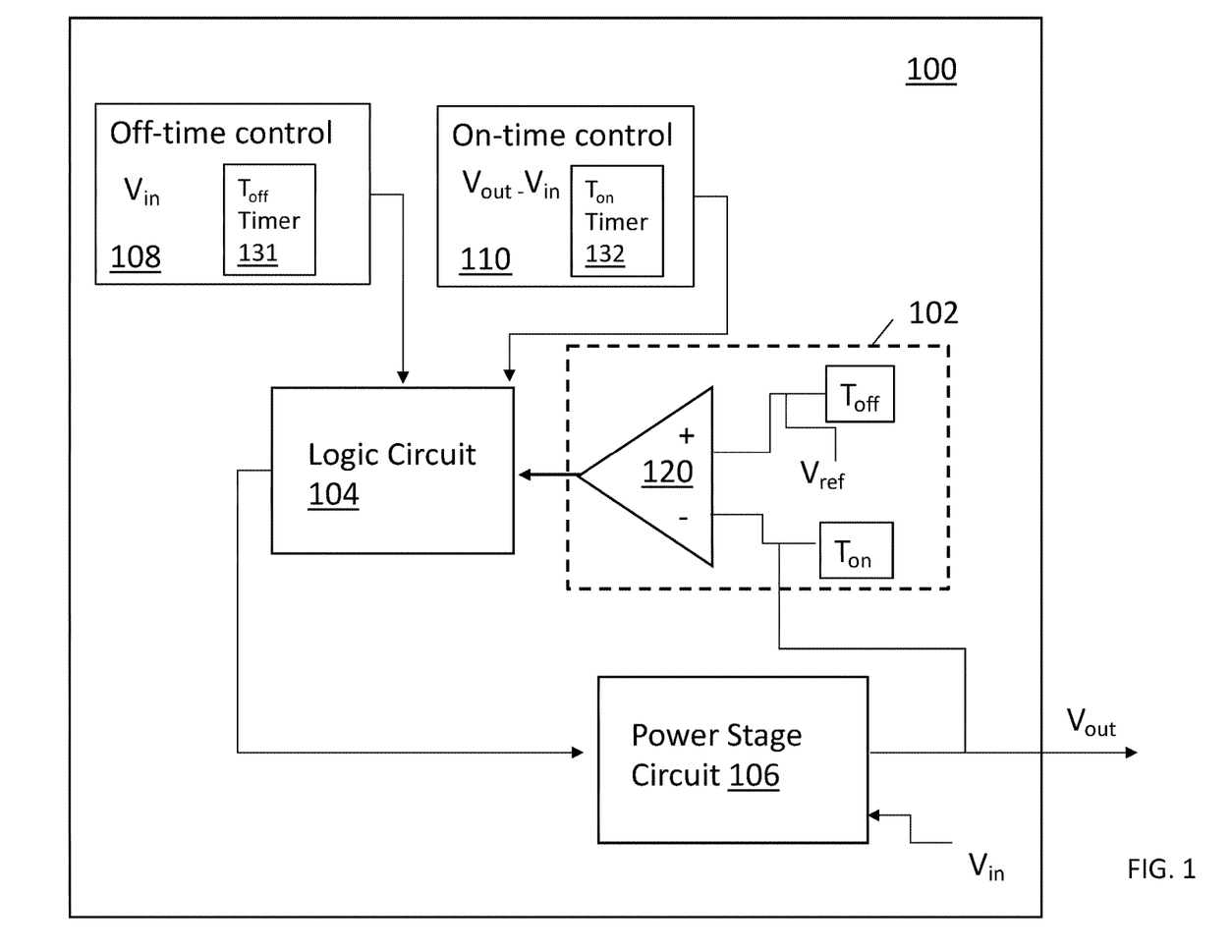
FIG. 1 is a block diagram of a constant on-time boost converter at which embodiments of the present inventive concepts can be practiced.

FIG. 1 is a block diagram of a constant on-time boost converter 100 at which embodiments of the present inventive concepts can be practiced.

The boost converter 100 can be constructed and arranged to produce from an input voltage $V_{in}$ coupled to a power stage inductor (not shown) a step up voltage that is output as an output voltage $V_{out}$ from a power stage circuit 106. The boost converter 100 can be implemented in general wireless systems of various industrial, commercial, or automotive applications, for example, providing power management for portable devices including mobile products having Li-ion batteries. Unlike other hysteretic power converters, the constant on-time boost converter 100 can offer a simple architecture and favorable dynamic response.

As shown in FIG. 1, the boost converter 100 may comprise a voltage loop circuit 102, a logic circuit 104, a power stage circuit 106, an off-time control circuit 108, and an on-time control circuit 110.

The voltage loop circuit 102 may include a comparator or related closed loop error amplifier 120 that controls a feed-forward voltage in a DC/DC, DCM, or CCM operation, depending on the configuration and intended features of the amplifier 120. The voltage loop circuit 102 may also include a feedback divider, one or more capacitors, reference voltage source, and so on, for example, shown in FIG. 5. In some embodiments, the voltage loop comparator 120 may have a first input 611 that receives an off-time sawtooth wave and a second input 612 or feedback node e.g., an inverting input that receives an on-time sawtooth wave. The voltage signals forming the sawtooth waves may be provided by an off-time ($T_{off}$) timer 131 and an on-time ($T_{on}$) timer 132, respectively. The comparator 120 may have an output port 613 configured to output a trigger signal (vout_cmp), i.e., an on trigger signal and/or an off trigger signal generated in response to the receipt by the comparator 120 of the received on and off-time sawtooth waves of the sawtooth-type voltage signals, respectively.

The logic circuit 104 can be electrically coupled to the output of the voltage loop circuit 102 and may determine the duty cycle of the converter, and in doing so may generate a pulse width modulation (PWM) signal or the like for regulating the output voltage of a power converter switching stage including the power stage circuit 106. The logic circuit 104 can include a combination of digital logic devices such as a combination of AND OR gate circuits, flip-flips, and so on. In some embodiments, the flip-flop can be a Set-Reset (SR) type flip-flop. The output of the logic circuit 104, e.g., the output (Q) of the SR-type flip-flop, can provide a drive signal to drive an inductor 310 (see FIG. 2) of the power stage circuit 106. In response to an on-trigger signal, the logic circuit 104 can provide a control signal such that the period $T_{on}$ and/or $T_{off}$ is controlled to be constant. In one embodiment, the logic circuit 104 has at least two RS flip-flops (not shown), each having a set terminal (S), a reset terminal (R) and an output terminal (Q), wherein the set terminal (S) communicates with the output terminal of the comparator 120 to receive the trigger signal. The reset terminal (R) of a first flip-flop can be coupled to the output terminal of the on-time control circuit 110 and the reset terminal (R) of a second flip-flop can be coupled to the output terminal of the off-time control circuit 108. The output terminals (Q) of the flip-flops may be coupled to the power stage circuit 106.

Figure 2:
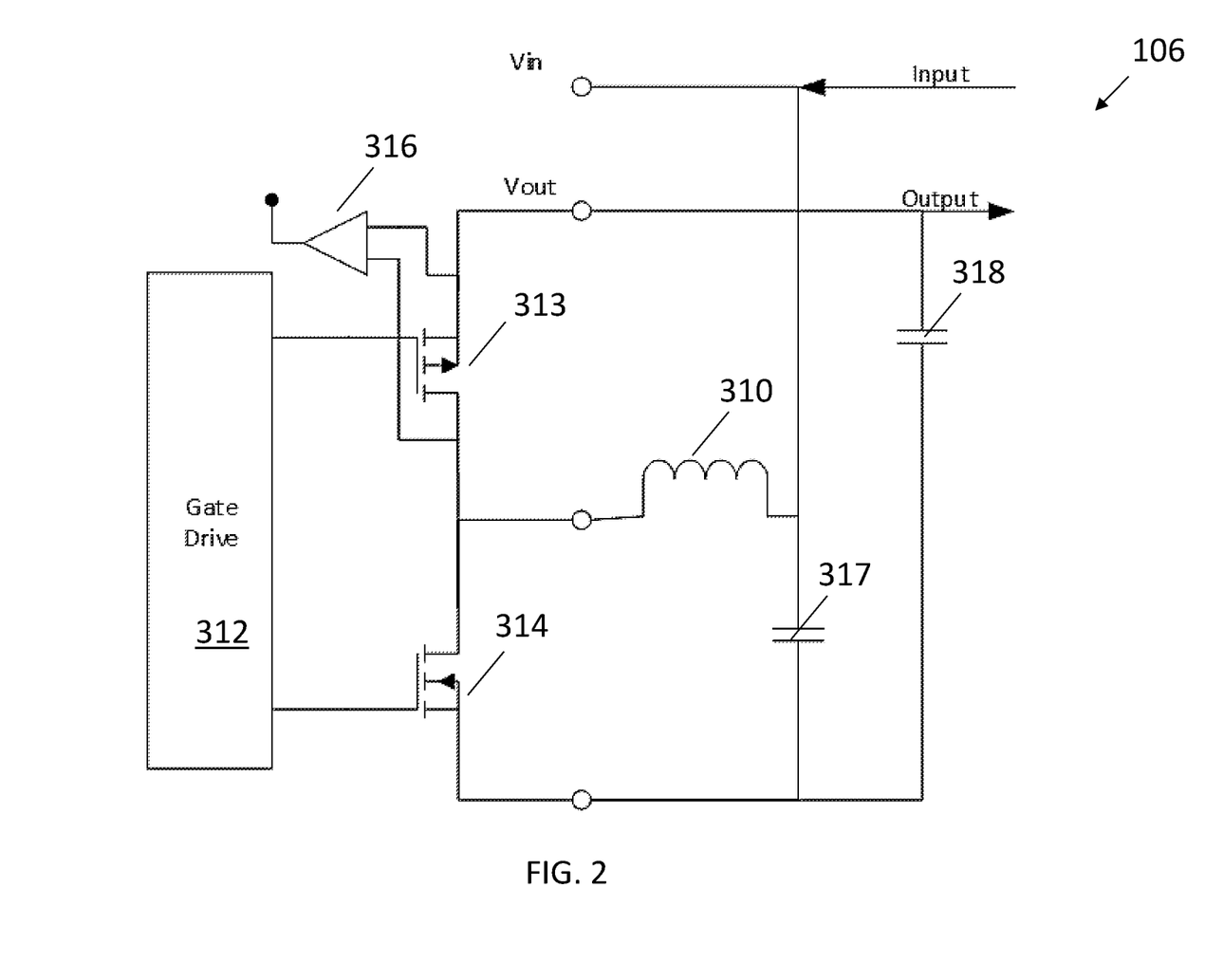
FIG. 2 is a circuit diagram of a power stage of the boost converter of FIG. 1.

As shown in FIG. 2, the power stage circuit 106 may be constructed and arranged as a half-bridge with an inductor 310, for example, a 1 µH inductor but not limited thereto.

The power stage circuit 106 may include a gate drive circuit 312 or the like that receives an input signal from the logic circuit 104 of FIG. 1. In some embodiments, the logic circuit 104 includes first and second SR-type flip-flops (not shown) that output differential signals to a P gate input and a N gate input of the gate driver, respectively, to determine the duty cycle and provide the drive signal to a first switch 313, e.g., an PMOS circuit, and/or a second switch 314, e.g., a NMOS circuit, in communication with a first side of the inductor 310. A second side of the inductor 310 is coupled to an input voltage source $V_{in}$. The first and second switches 313, 314 can be connected in series. In some embodiments, the second switch 314 is a NMOS transistor having a source coupled to a ground reference.

Accordingly, the power stage circuit 106 is constructed and arranged to include two power devices in series, the first power device driving the inductor 310 with an output voltage level and the second power device driving the inductor 310 with a ground. During operation, the inductor current can increase linearly when the second switch 314 is in a conducting state since the input voltage $V_{in}$ is at one side of the inductor 310 opposite the side of the inductor 310 at which the power stage circuit 106 is coupled. In particular, the inductor current can increase linearly when the NMOS transistor 314 or other switch element is conducting, since the input voltage $V_{in}$ is connected across the inductor 310.

At the end of the on-time period, the NMOS transistor 314 enters an open state and the PMOS transistor 313 enters a closed state, thereby connecting the output voltage $V_{out}$ to the inductor 310. Since $V_{out} > V_{in}$, the inductor current will decrease linearly.

The boost converter 100 may operate in either a Continuous Conduction Mode (CCM) or a Discontinuous Current Mode (DCM), or Pulse Frequency Mode (PFM).

In a CCM state, the inductor current increases and decreases with the switching frequency and duty cycle, but the inductor current is not 0 Amps during the duty cycle. However, in a DCM, the inductor current returns to 0 Amps, and remains at 0 Amps for part of the period. The DCM therefore has an on-time ($T_{on}$), an off-time ($T_{off}$), and an idle time. In CCM, for high load currents, the idle time disappears and the inductor current does not return to 0 Amps and instead becomes continuous. Accordingly, when operating in a CCM environment, the control loop including the comparator 120 can manage the duty cycle and in doing so can control the on-time $T_{on}$ (shown in FIG. 5) for a constant frequency.

Figure 3:
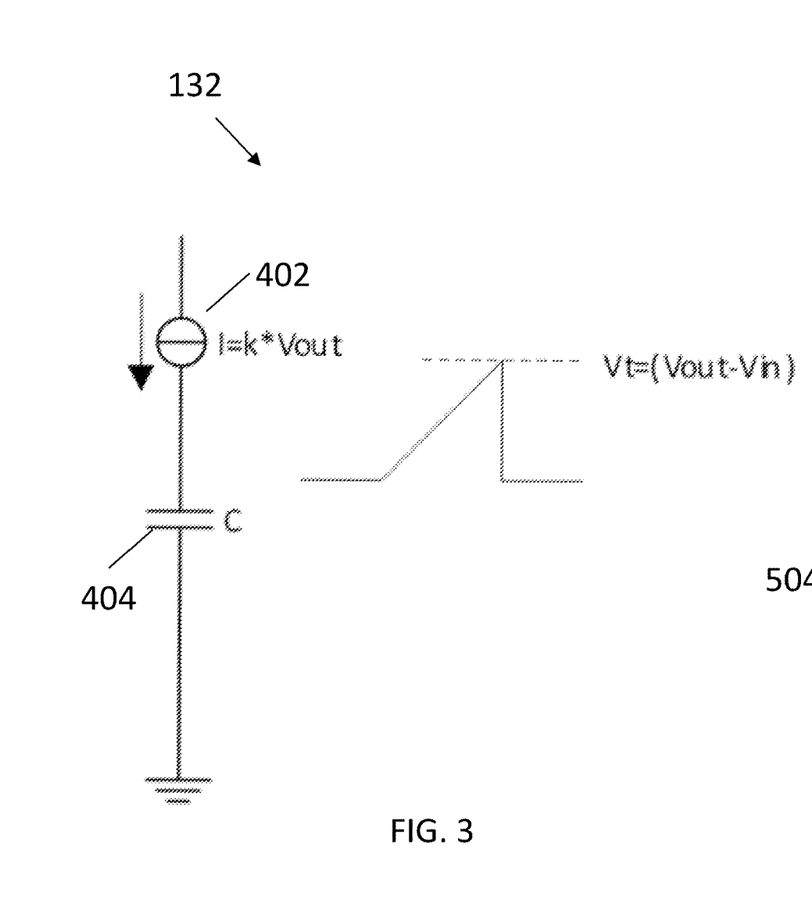
FIG. 3 is a circuit diagram of an on-time control circuit of a boost converter, in accordance with an embodiment.

As shown in FIG. 3, the on-time control circuit 110 may include a capacitor 404 that is charged with a current source 402 that provides a current (i) that is proportional to the output voltage $V_{out}$ (e.g, $I=k*V_{out}$) until a voltage level $V_t$ proportional to $V_{out}-V_{in}$ is reached. The capacitor 404 is charged and discharged to form the corresponding sawtooth wave. The sawtooth wave according to the voltage signal $V_{out}-V_{in}$ can be provided to the feedback node of the voltage loop comparator 120.

Figure 4:
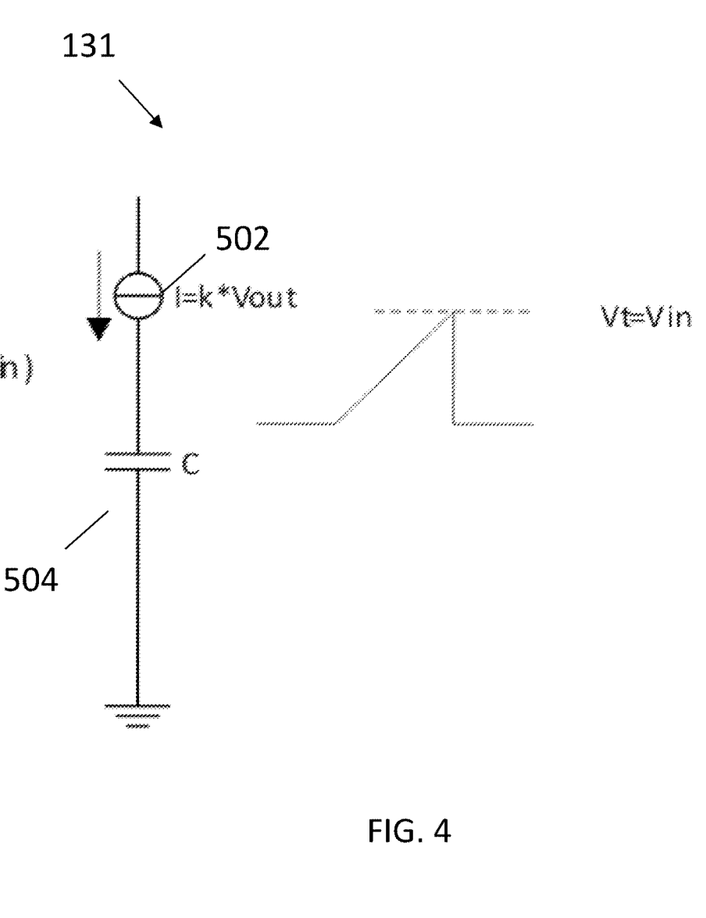
FIG. 4 is a circuit diagram of an off-time control circuit of a boost converter, in accordance with an embodiment.

As shown in FIG. 4, the off-time control circuit 108 may have a same or similar construction as the on-time control circuit 110, i.e., a same or similar current source 502 and capacitor 504, except that the comparator voltage trip level $V_t$ is equal to the input voltage $V_{in}$. The sawtooth wave according to the voltage signal $V_{in}$ can be provided to the reference node of the voltage loop comparator 120. It is well-known that the control loop of the converter can permit the synthetic ripple signal to be fed to the comparator 120, which is required to properly switch the comparator 120 and to determine the charge and discharge timing of the inductor. A minimum off-time signal value may be required to prevent a deadlock situation during a startup operation. Here, the minimum off-time signal value may be used during startup due to a 100% duty cycle and high inductor current while no power is transferred to the output. In some embodiments, to allow for the control loop to function properly, the minimum off-time should be lower than the steady-state off time. Accordingly, the minimum off-time may be configured to be a fraction of the nominal off-time, for example, 50% of the nominal off-time which may be achieved by applying $V_{in}/2$ instead of the input voltage $V_{in}$ to the comparator input node.

As described above, the difference between the on-time control circuit 110 and the off-time control circuit 108 is the comparator trip level of each, namely, ($V_{out}-V_{in}$) for an on-time signal value output from the on-time control circuit 110 and $V_{in}$ for an off-time signal value output from the off-time control circuit 108.

Figure 5:
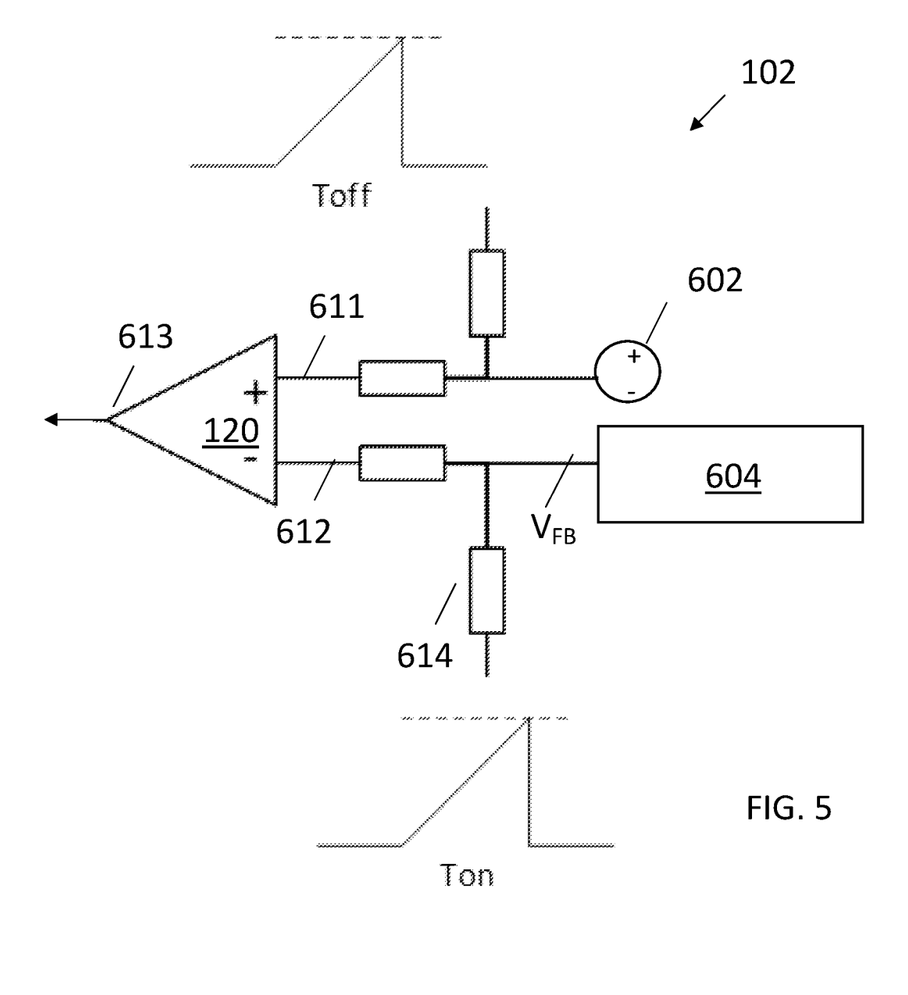
FIG. 5 is a circuit diagram of a voltage loop circuit of the boost converter of FIG. 1.

FIG. 5 is a schematic representation of a voltage loop circuit 102 of a boost converter, in accordance with an embodiment. The voltage loop circuit 102 includes a reference voltage source 602 and a feedback circuit 604. In some embodiments, the feedback circuit 604 may include a feedback divider 604 comprising a combination of resistors, capacitors, and the like.

As shown in FIG. 5, the on-time and off-time sawtooth voltages applied to the inputs of the voltage loop comparator 120 are active alternately so that one of the on-time circuit and off-time circuit at a time provides a sawtooth voltage signal, which prevents or eliminates mutual influencing, or noise, at the electrical components, for example, the input ports, with respect to each other. In some embodiments, the off-time sawtooth wave received from the $T_{off}$ timer 131 can act on a reference voltage from the reference voltage source 602 applied to the reference node of the voltage loop comparator 120. The on-time sawtooth wave received from the $T_{on}$ timer 132 can act on the feedback signal from the node (FB point) of the feedback circuit 604 applied to the feedback (inverting input) node of the voltage loop comparator 120. If the on-time sawtooth wave increases, then the feedback voltage at the feedback node increases which reduces the on-time. The current source in the on-time generator depends on the voltage $V_{out}$ and the current will then increase, resulting in a shorter on-time. On the other hand, the longer the off-time, the larger the voltage of the off-time sawtooth. This will increase the output voltage but reduce the off-time.

The combination of the on-time and off-time voltage signals received and processed by the voltage loop comparator 120 can provide a synthetic ripple, for example, shown in FIGS. 2 and 8, which can emulate the inductor current or the voltage across an output capacitor 318 in order to regulate the output voltage at the inductor 310 at a desired level. More specifically, the positive slope of the ripple corresponds to the off-time voltage signal in response to a charging of the capacitor during the off-time. The off-time sawtooth is fed to the feedback node of the voltage loop comparator 120. The negative slope of the ripple corresponds to the on-time, i.e., discharge of the capacitor occurs during the on-time, and is provided to the reference node. Separating the slopes of the ripple in this manner negates the need for a subtraction operation where the voltages are subtracted from the positive sawtooth and the result is fed to the feedback node. As shown in FIGS. 3 and 4, the sawtooth waves can be generated by identical current sources 402, 502 and capacitors 404, 504 to provide a reliable operation.

Figure 6A:
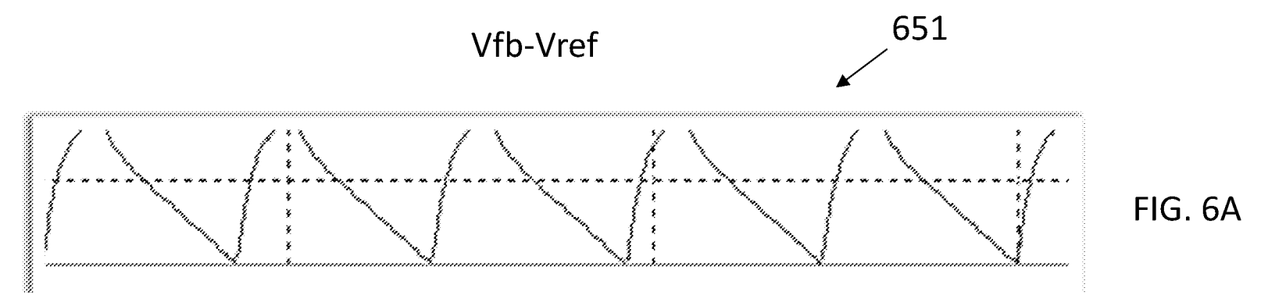
FIGS. 6A and 6B are graphs illustrating differential ripple voltages and corresponding inductor currents generated by a constant on-time boost converter, in accordance with an embodiment.
Figure 6B:
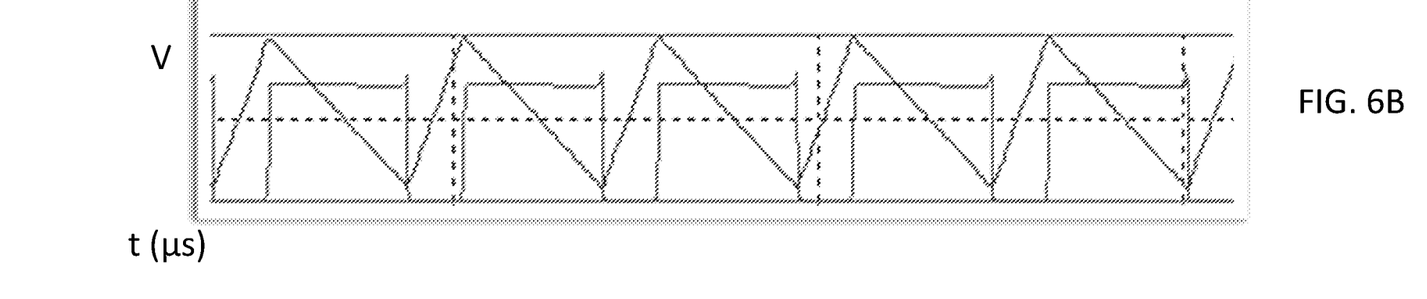

Accordingly, the boost converter may act as a hysteretic converter with respect to the ripple voltages 651 at the comparator inputs producing voltage waves similar to those of the inductor currents, as shown in FIGS. 6A and 6B. In particular, the waves 651 have a similar polarity and phase, and can therefore reduce system instability while providing high reliability. Here, the displayed voltage differential includes a difference of the feedback voltage (Vfb) and the reference voltage (Vref). Any DC error that is introduced is insignificant because it is constant over the range of input voltages and can be compensated.

In other embodiments, a ripple voltage generated by the on-time control circuit 110 is not processed by the boost converter 100, since it has no impact at the moment of switch-off. In particular, the state of the feedback comparator at the end of the off-time determines if a next cycle will start. Any ripple inserted during the on-time only is not present during the off-time and may not have an influence on the speed of the feedback comparator. Ripple during the off-time may occur before a next cycle may or may not be started and has much more influence. If the control loop including the loop comparator 120 detects the start of a new switching cycle, it can be during the off-time. The output of the on-time control circuit 110 is not active, so it has no influence on the generated synthetic ripple. Accordingly, the resistor 614 shown in FIG. 5 in the signal path from the on-time control circuit 110 to the voltage loop comparator 120 can be omitted.

Figure 7A:
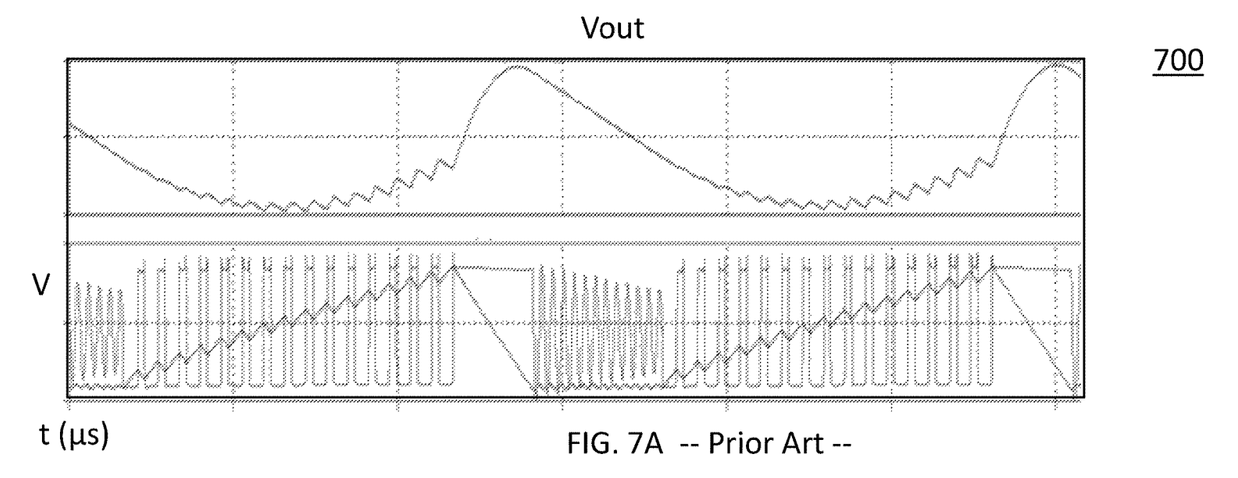
FIGS. 7A and 7B are graphs illustrating comparative results between a burst mode of a conventional boost converter and the boost converter of FIG. 1.
Figure 7B:
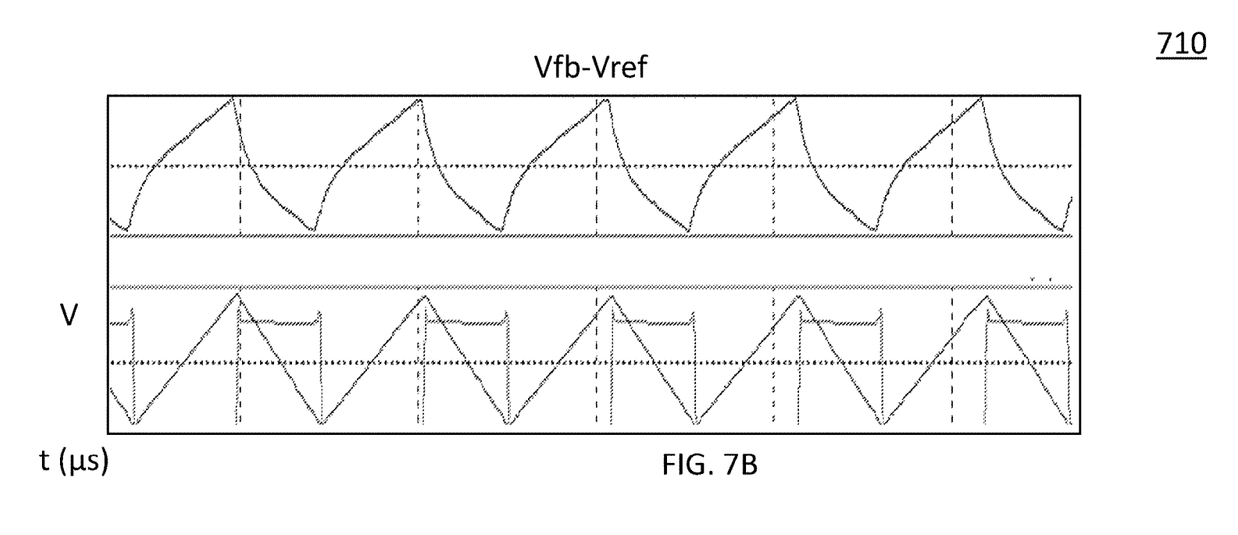

FIGS. 7A and 7B are graphs 700, 710 illustrating comparative results between a burst mode of a conventional boost converter and the boost converter of FIG. 1. In particular, FIG. 7B illustrates a synthetic ripple produced by the voltage loop circuit 102 to prevent the burst mode shown in FIG. 7A.

As will be appreciated, at least some embodiments include the following embodiments. In one embodiment, a boost converter comprises a comparator circuit including: a first input port configured to receive an off-time sawtooth voltage; and a second input port configured to receive an on-time sawtooth voltage the comparator circuit comparing the off-time sawtooth voltage and on-time sawtooth voltage to generate trigger signal including a differential ripple voltage that is output by an output port to a power stage circuit. The boost converter further comprising: a reference voltage source that provides a reference voltage to the first input port, wherein the off-time sawtooth voltage is applied to the reference voltage; and a feedback circuit that provides the on-time sawtooth voltage to the second port, wherein the differential ripple voltage emulates an inductor current of the power stage circuit or the voltage across an equivalent series resistance (ESR) of an output capacitor of the power stage circuit.

Alternative embodiments of the boost converter include one of the following features, or any combination thereof.

The feedback circuit includes a feedback divider that includes a combination of resistors and capacitors to generate a feedback voltage signal proportional to an output voltage of the power stage circuit and acted on by an off-time timer that provides the reference voltage to which the off-time sawtooth voltage is applied.

The capacitors include an on-timer capacitor that is charged with a current proportional to the output voltage until a level proportional to a voltage difference of the comparator trip level is reached.

The combination of the on-time and off-time voltage signals received and processed by the comparator circuit provides a synthetic ripple, which emulates the inductor current or the voltage across the output capacitor in order to regulate the output voltage at the inductor.

The on-time sawtooth voltage and off-time sawtooth voltage are active alternately, and input to the first input port and second input port, respectively, to prevent mutual influence effects at the first input port and second input port.

An increase in the on-time sawtooth voltage acting on a feedback node at the second input results in an increase in the output voltage and a reduction in the off-time sawtooth voltage.

The on-time sawtooth voltage and the off-time sawtooth voltage are generated with identical current sources and identical capacitors.

The comparator circuit detects a start of a new switching cycle only during an off-time of a period, wherein the on-time sawtooth voltage does not impact an output from the output port.

In another embodiment, a boost converter comprises a comparator circuit that generates a trigger signal including a differential ripple voltage in response to a receipt of an on-time sawtooth voltage and an off-time sawtooth voltage; a power stage circuit that generates an output voltage in response to the trigger signal; an off-time control circuit that provides the off-time sawtooth voltage to a first input port of the comparator circuit; and an on-time control circuit that provides the on-time sawtooth voltage to a second input port of the comparator circuit, wherein the differential ripple voltage emulates an inductor current of the power stage circuit or the voltage across an equivalent series resistance (ESR) of an output capacitor of the power stage circuit.

Alternative embodiments of the boost converter include one of the following features, or any combination thereof.

The boost converter further comprises a logic circuit between the comparator circuit and the power stage circuit for regulating the output voltage by providing a control signal that controls a time period of the on-time sawtooth voltage and an off-time sawtooth voltage.

The power stage circuit includes: an inductor which produces the inductor current emulated by the differential ripple voltage; a gate drive circuit for driving the inductor with a ground or output voltage level; and an input voltage source at an opposite end of the inductor as the gate drive circuit to permit the inductor current to be increased or decreased according to a comparative relationship between an input voltage provided by the input voltage source and the output voltage.

The comparator circuit comprises: a reference voltage source that provides a reference voltage to a first input port of the comparator circuit, wherein the off-time sawtooth voltage is applied to the reference voltage; and a feedback circuit that provides the on-time sawtooth voltage to a second input port of the comparator circuit, wherein the feedback circuit generates a feedback voltage signal proportional to the output voltage of the power stage circuit and acted on by a generator of the reference voltage that provides the reference voltage to which the off-time sawtooth voltage is applied.

The combination of the on-time and off-time voltage signals received and processed by the comparator circuit provides a synthetic ripple, which emulates the inductor current or the voltage across the output capacitor in order to regulate the output voltage at the inductor.

The on-time sawtooth voltage and off-time sawtooth voltage are active alternately, and input to the first input port and second input port, respectively, to prevent mutual influence effects at the first input port and second input port.

An increase in the on-time sawtooth voltage acting on a feedback node at the second input results in an increase in the output voltage and a reduction in the off-time sawtooth voltage.

In another embodiment, a battery-powered portable electronic device comprises a power stage circuit that generates an output voltage in response to the trigger signal; an inductor coupled between an input voltage and the power stage circuit for modifying the inductor current according to a comparative relationship between the input voltage and the output voltage; and a voltage loop circuit that generates a differential ripple voltage for output to the power stage circuit in response to an off-time sawtooth voltage and an on-time sawtooth voltage, wherein the differential ripple voltage emulates an inductor current of the inductor.

Alternative embodiments of the boost converter include one of the following features, or any combination thereof.

A logic circuit is between the voltage loop circuit and the power stage circuit for regulating the output voltage by providing a control signal that controls a period of the on-time sawtooth voltage and an off-time sawtooth voltage.

The combination of the on-time and off-time voltage signals received and processed by the comparator circuit provides a synthetic ripple, which emulates the inductor current or the voltage across the output capacitor in order to regulate the output voltage at the inductor.

The on-time sawtooth voltage and off-time sawtooth voltage are active alternately, and input to the first input port and second input port, respectively, to prevent mutual influence effects at the first input port and second input port.

The on-time sawtooth voltage and the off-time sawtooth voltage are generated with identical current sources and identical capacitors.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A boost converter, comprising:
 a comparator circuit, including:
  a first input port configured to receive an off-time sawtooth voltage; and
  a second input port configured to receive an on-time sawtooth voltage, the comparator circuit configured to compare the off-time sawtooth voltage and on-time sawtooth voltage to generate a trigger signal including a differential ripple voltage that is output by an output port to a power stage circuit;
 a reference voltage source configured to provide a reference voltage to the first input port, wherein the off-time sawtooth voltage is applied to the reference voltage; and
 a feedback circuit configured to provide the on-time sawtooth voltage to the second input port, wherein the differential ripple voltage emulates an inductor current of the power stage circuit or the voltage across an equivalent series resistance (ESR) of an output capacitor of the power stage circuit.

2. The boost converter of claim 1, wherein the feedback circuit includes a feedback divider that includes a combination of resistors and capacitors to generate a feedback voltage signal proportional to an output voltage of the power stage circuit and acted on by an off-time timer that provides the reference voltage to which the off-time sawtooth voltage is applied.

3. The boost converter of claim 2, wherein the capacitors include an on-time capacitor that is charged with a current proportional to the output voltage until a level proportional to a voltage difference of the comparator trip level is reached.

4. The boost converter of claim 2, wherein the combination of the on-time and off-time voltage signals received and processed by the comparator circuit provides a synthetic ripple, which emulates the inductor current or the voltage across the output capacitor in order to regulate the output voltage at the inductor.

5. The boost converter of claim 1, wherein the on-time sawtooth voltage and the off-time sawtooth voltage are active alternately and input to the first input port and second input port, respectively, to prevent mutual influence effects at the first input port and second input port.

6. The boost converter of claim 1, wherein an increase in the on-time sawtooth voltage acting on a feedback node at the second input results in an increase in the output voltage and a reduction in the off-time sawtooth voltage.

7. The boost converter of claim 1, wherein the on-time sawtooth voltage and the off-time sawtooth voltage are generated with identical current sources and identical capacitors.

8. The boost converter of claim 1, wherein the comparator circuit detects a start of a new switching cycle only during an off-time of a period, wherein the on-time sawtooth voltage does not impact an output from the output port.

9. A boost converter comprising:
a comparator circuit configured to generate a trigger signal including a differential ripple voltage in response to a receipt of an on-time sawtooth voltage and an off-time sawtooth voltage, the comparator circuit comprising:
a reference voltage source that provides a reference voltage to a first input port of the comparator circuit, wherein the off-time sawtooth voltage is applied to the reference voltage; and
a feedback circuit that provides the on-time sawtooth voltage to a second input port of the comparator circuit, wherein the feedback circuit generates a feedback voltage signal proportional to the output voltage of the power stage circuit and acted on by a generator of the reference voltage that provides the reference voltage to which the off-time sawtooth voltage is applied;
a power stage circuit configured to generate an output voltage in response to the trigger signal;
an off-time control circuit configured to provide the off-time sawtooth voltage to a first input port of the comparator circuit; and
an on-time control circuit configured to provide the on-time sawtooth voltage to a second input port of the comparator circuit, wherein the differential ripple voltage emulates an inductor current of the power stage circuit or the voltage across an equivalent series resistance (ESR) of an output capacitor of the power stage circuit.

10. The boost converter of claim 9, further comprising:
a logic circuit between the comparator circuit and the power stage circuit for regulating the output voltage by providing a control signal that controls a period of the on-time sawtooth voltage and an off-time sawtooth voltage.

11. The boost converter of claim 9, wherein the power stage circuit includes:
an inductor which produces the inductor current emulated by the differential ripple voltage;
a gate drive circuit for driving the inductor with a ground or output voltage level; and
an input voltage source at an opposite end of the inductor as the gate drive circuit to permit the inductor current to be increased or decreased according to a comparative relationship between an input voltage provided by the input voltage source and the output voltage.

12. The boost converter of claim 9, wherein the combination of the on-time and off-time voltage signals received and processed by the comparator circuit provides a synthetic ripple, which emulates the inductor current or the voltage across the output capacitor in order to regulate the output voltage at the inductor.

13. The boost converter of claim 9, wherein the on-time sawtooth voltage and off-time sawtooth voltage are active alternately, and input to the first input port and second input port, respectively, to prevent mutual influence effects at the first input port and second input port.

14. The boost converter of claim 9, wherein an increase in the on-time sawtooth voltage acting on a feedback node at the second input results in an increase in the output voltage and a reduction in the off-time sawtooth voltage.

15. A battery-powered portable electronic device, comprising:
a power stage circuit configured to generate an output voltage in response to a trigger signal;
an inductor coupled between an input voltage and the power stage circuit for modifying an inductor current according to a comparative relationship between the input voltage and the output voltage; and
a voltage loop circuit including a comparator circuit configured to generate a differential ripple voltage for output to the power stage circuit in response to an off-time sawtooth voltage and an on-time sawtooth voltage, wherein the differential ripple voltage emulates the inductor current of the inductor, the comparator circuit comprising:
a reference voltage source that provides a reference voltage to a first input port of the comparator circuit, wherein the off-time sawtooth voltage is applied to the reference voltage; and
a feedback circuit that provides the on-time sawtooth voltage to a second input port of the comparator circuit, wherein the feedback circuit generates a feedback voltage signal proportional to the output voltage of the power stage circuit and acted on by a generator of the reference voltage that provides the reference voltage to which the off-time sawtooth voltage is applied.

16. The battery-powered portable electronic device of claim 15, further comprising:
a logic circuit between the voltage loop circuit and the power stage circuit for regulating the output voltage by providing a control signal that controls a period of the on-time sawtooth voltage and the off-time sawtooth voltage.

17. The battery-powered portable electronic device of claim 15, wherein the combination of the on-time and off-time voltage signals received and processed by the comparator circuit provides a synthetic ripple, which emulates the inductor current or the voltage across the output capacitor in order to regulate the output voltage at the inductor.

18. The battery-powered portable electronic device of claim 15, wherein the on-time sawtooth voltage and off-time sawtooth voltage are active alternately, and input to the first input port and second input port, respectively, to prevent mutual influence effects at the first input port and second input port.

19. The battery-powered portable electronic device of claim 15, wherein the on-time sawtooth voltage and the off-time sawtooth voltage are generated with identical current sources and identical capacitors.

* * * * *